(12) United States Patent
Enokijima et al.

(10) Patent No.: US 7,374,407 B2
(45) Date of Patent: May 20, 2008

(54) POWER TRANSMISSION MECHANISM AND PROCESS OF ASSEMBLING THE SAME

(75) Inventors: Fuminobu Enokijima, Kariya (JP); Masakazu Murase, Kariya (JP); Masaki Ota, Kariya (JP); Masaki Inoue, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 574 days.

(21) Appl. No.: 10/979,676

(22) Filed: Nov. 2, 2004

(65) Prior Publication Data
US 2005/0100397 A1 May 12, 2005

(30) Foreign Application Priority Data
Nov. 7, 2003 (JP) ............................. 2003-378843

(51) Int. Cl.
*F04B 49/00* (2006.01)
*B25G 3/00* (2006.01)

(52) U.S. Cl. ...................................... 417/223; 403/299
(58) Field of Classification Search ................ 403/299, 403/342; 464/182, 32; 417/223, 222.1, 417/269
See application file for complete search history.

(56) References Cited

U.S. PATENT DOCUMENTS 2,269,799 A * 1/1942 Upson .......................... 464/89

5,810,533 A 9/1998 Nakamura
2003/0012661 A1 * 1/2003 Kawata et al. .............. 417/223
2003/0194263 A1 * 10/2003 Ueda et al. ..................... 403/2

FOREIGN PATENT DOCUMENTS

| JP | 2001-124176 | 5/2001 |
| JP | 2003-028183 | 1/2003 |
| JP | 2003-130078 | 5/2003 |
| JP | 2003-035255 | 7/2003 |

* cited by examiner

*Primary Examiner*—Devon Kramer
*Assistant Examiner*—Jessica L Frantz
(74) *Attorney, Agent, or Firm*—Knoble Yoshida & Dunleavy, LLC

(57) ABSTRACT

A power transmission mechanism for transmitting driving power between a shaft and a rotor connected to the shaft includes a cylindrical adapter located between the shaft and the rotor and a screw seat arranged on the shaft. The adapter has a first internally threaded portion in its inner peripheral surface and a first externally threaded portion in its outer peripheral surface. The first internally threaded portion is engaged with a second externally threaded portion of the shaft, and the first externally threaded portion is engaged with a second internally threaded portion of the rotor. The screw seat has a screw seat surface. The adapter is screwed onto the shaft such that the adapter is pressed against the screw seat surface, and the rotor is screwed onto the adapter such that the rotor is pressed against the screw seat surface.

11 Claims, 3 Drawing Sheets

POWER TRANSMISSION MECHANISM AND PROCESS OF ASSEMBLING THE SAME

BACKGROUND OF THE INVENTION

The present invention relates to a power transmission mechanism for transmitting driving power between a shaft and a rotor connected to the shaft and also to its assembling process.

Conventionally, some refrigerant compressors in vehicle air conditioning system are equipped with a power transmission mechanism 100, as shown in FIG. 4, for transmitting driving power from a vehicle engine to a drive shaft (c.f. Page 4 and FIG. 1 in Unexamined Japanese Patent Publication No. 2003-28183). A rotor 102 is rotatably supported by an extension of a housing 101 of the refrigerant compressor through a bearing 103, and the driving power is transmitted to the rotor 102 from the vehicle engine (not shown). A hub 105 is fastened securely to the outer end portion of a drive shaft 104 of the refrigerant compressor. The hub 105 is connected to the rotor 102 so as to be rotatable therewith. Thus, the driving power transmitted to the rotor 102 from the vehicle engine is further transmitted to the drive shaft 104 through the hub 105.

As shown in FIG. 5, a screw mechanism is used for fastening the hub 105 to the drive shaft 104. Specifically, the drive shaft 104 is formed at the end portion thereof extending out of the refrigerant compressor with an externally threaded portion 106. A screw seat member 107 having a screw seat surface 107a is fixed on the drive shaft 104 adjacent to and on the inner side of the externally threaded portion 106. The hub 105 is formed at its axial center with an internally threaded portion 108. The hub 105 is screwed onto the drive shaft 104 through engagement of their threaded portions 108, 106, and the inner surface of the hub 105 is pressed against the screw seat surface 107a of the screw seat member 107. Thus, the hub 105 is fastened to the drive shaft 104.

The drive shaft 104 has a whirl-stopper 109 at the end thereof that is held by a chuck (not shown) of an assembling machine when assembling the drive shaft 104 and the hub 105 by screwing, or when rotating either one of the drive shaft 104 and the hub 105 relative to the other during assembling. The diameter of the whirl-stopper 109 is smaller than that of the externally threaded portion 106 so that the chuck can hold the whirl-stopper 109 stably even when the hub 105 is located over the whirl-stopper 109 during relative screwing movement of the drive shaft 104 and the hub 105. Thus, this difference in diameter provides a space for permitting the chuck to hold the swirl-stop portion 109.

In the above-described power transmission mechanism 100, however, the hub 105 is tightened to the drive shaft 104 with a tightening torque greater than the maximum torque in order to prevent the hub 105 from sliding relative to the drive shaft 104 even when the torque to be transmitted between the hub 105 and the drive shaft 104 is at the maximum value of driving torque during normal operation (or the greatest torque). Thus, a great load is applied to the drive shaft 104 in assembling the drive shaft 104 and the hub 105 by screwing, so that there is a fear that the whirl-stopper 109 with a small diameter is broken at its base.

A fluid machine, for example, the above refrigerant compressor, has a shaft seal device 110 in the housing 101 for sealing the drive shaft 104. The shaft seal device 110 performs the function of sealing the drive shaft 104 while slidably contacting with the outer peripheral surface of the drive shaft 104. Thus, for the purpose of improving the durability of the shaft seal device 110, the drive shaft 104 is formed in such a way that the diameter of the portion thereof which is in slide contact with the shaft seal device 110 is smaller than that of the inner portion of the drive shaft 104, so that peripheral speed and hence the sliding contact at the former portion of the drive shaft 104 is reduced.

Since the drive shaft 104 is installed through the shaft seal device 110 by inserting firstly the whirl-stopper 109 thereof into the shaft seal device 110 in assembling of the refrigerant compressor, the diameter of the externally threaded portion 106, which are formed on outer portion of the drive shaft 104 than the shaft seal device 110, needs to be smaller than that of the portion of the drive shaft 104 that is in slide contact with the shaft seal device 110. As mentioned earlier herein, the diameter of the whirl-stopper 109 is still smaller than the externally threaded portion 106 in order to provide a space for the chuck to hold the whirl-stopper 109 of the drive shaft 104. Therefore, it is still harder to ensure sufficient durability of the whirl-stopper 109 and the whirl-stopper 109 tends to be easily broken during the work of screwing the drive shaft 104 and the hub 105.

The present invention is directed to a power transmission mechanism that prevents damage to a shaft during assembling and also an assembling process for the power transmission mechanism.

SUMMARY OF THE INVENTION

According to the present invention, a power transmission mechanism for transmitting driving power between a shaft and a rotor connected to the shaft includes a cylindrical adapter located between a shaft and a rotor. The adapter has a first internally threaded portion in its inner peripheral surface and a first externally threaded portion in its outer peripheral surface. The first internally threaded portion is engaged with a second externally threaded portion of the shaft. The first externally threaded portion is engaged with a second internally threaded portion of the rotor. The screw seat is arranged on the shaft and the screw seat has a screw seat surface. The adapter is screwed onto the shaft such that the adapter is pressed against the screw seat surface, and the rotor is screwed onto the adapter such that the rotor is pressed against the screw seat surface. The shaft is a drive shaft of a fluid machine. The fluid machine has a shaft seal device arranged between the drive shaft and a housing of the fluid machine. The shaft seal device seals off from the outside of the housing. The rotor for transmitting the driving power to the drive shaft is fastened to the drive shaft on the outside of the housing.

The present invention also provides a process of assembling a power transmission mechanism for transmitting driving power between a shaft and a rotor connected to the shaft. The power transmission mehcanism includes a cylindrical adapter located between the shaft and the rotor and a screw seat arranged on the shaft. The adapter has a first internally threaded portion in its inner peripheral surface and a first externally threaded portion in its outer peripheral surface. The first internally threaded portion is engaged with a second externally threaded portion of the shaft. The first externally threaded portion is engaged with a second internally threaded portion of the rotor. The screw seat has a screw seat surface. The shaft is a drive shaft of a fluid machine that includes a shaft seal device arranged between the drive shaft and a housing of the fluid machine. The shaft seal device seals off from the outside of the housing and includes the steps of inserting the drive shaft into the shaft seal device, screwing the adapter onto the shaft such that the adapter is pressed against the screw seat surface, and screwing the rotor onto the adapter and the shaft such that the rotor is pressed against the screw seat surface.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENT

A preferred embodiment of the present invention will be described. The preferred embodiment shows an example in which the present invention is applied to a power transmission mechanism that is used in a refrigerant compressor of a vehicle air conditioning system for transmitting power from a vehicle engine to the drive shaft of the refrigerant compressor.

Figure 1:
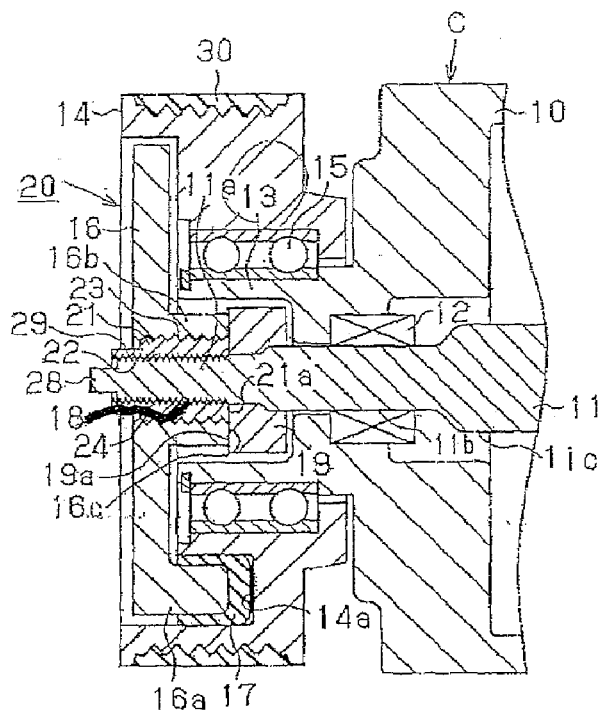
FIG. 1 is a cross-sectional partial view of a refrigerant compressor around a power transmission mechanism according to a preferred embodiment of the present invention.

FIG. 1 is a cross-sectional partial view of a refrigerant compressor C, showing part of the compressor C adjacent to a power transmission mechanism 20 thereof. A drive shaft 11 rotatably supported by a housing 10 of the refrigerant compressor C. The drive shaft 11 is made of an iron-based metal. An end portion 11a of the drive shaft 11 on the left side as seen in FIG. 1 is located extending out of the refrigerant compressor C (the end portion 11a being referred to as outer end portion 11a hereinafter). A shaft seal device 12 such as a lip seal is arranged between the drive shaft 11 and the housing 10 and seals off from the outside of the housing 10. In view of that the shaft seal device 12 lastingly performs its sealing function by slidably contacting with the peripheral surface of the drive shaft 11, the diameter of the portion 11b of the drive shaft 11 on which the shaft seal device 12 is installed is smaller than that of an inner portion 11c of the drive shaft 11, so that the peripheral rotational speed is less at the portion 11b of the drive shaft 11 than that of the portion 11c and, therefore, the durability of the shaft seal device 12 is improved due to less frictional force.

A boss 13 protrudes from the outer wall of the housing 10 so as to surround the outer end portion 11a of the drive shaft 11. A rotor 14 is rotatably supported by the boss 13 through a bearing 15. Driving power is transmitted from a vehicle engine (not shown) to the rotor 14 through a belt 30 trained round the rotor 14. A hub 16 as a rotor is fastened to the outer end portion 11a of the drive shaft 11. The hub 16 is made of an iron-based metal. A plurality of protrusions 16a is formed protruding from the outer peripheral portion of the hub 16 and arranged around the axis of the drive shaft 11 at an equiangular interval (only one such protrusion 16a being shown in FIG. 1). As many recesses 14a as the protrusions 16a are formed in the rotor 14 for loosely fitting the protrusions 16a therein, respectively.

A rubber damper 17 is stuffed in each clearance between the recess 14a of the rotor 14 and the protrusion 16a of the hub 16. Thus, the rotor 14 and the hub 16 are rotatable together with each other. Therefore, the driving power transmitted from the vehicle engine to the rotor 14 is further transmitted through the inner surface of the recess 14a, the rubber damper 17 and the outer surface of the protrusion 16a to the hub 16, from which the drive power is transmitted further to the drive shaft 11. Thus, the drive shaft 11 is rotated, thereby causing a compression mechanism (not shown) accommodated in the housing 10 to operate for compressing refrigerant gas. Even if torque fluctuates at either one of the vehicle engine or the refrigerant compressor C during the power transmission, relative rotation of the rotor 14 and the hub 16 is allowed at a constant angle by the elastic deformation of the rubber damper 17, with the result that the effect of the above torque fluctuation on the other of the vehicle engine and the refrigerant compressor C is alleviated.

Figure 2:
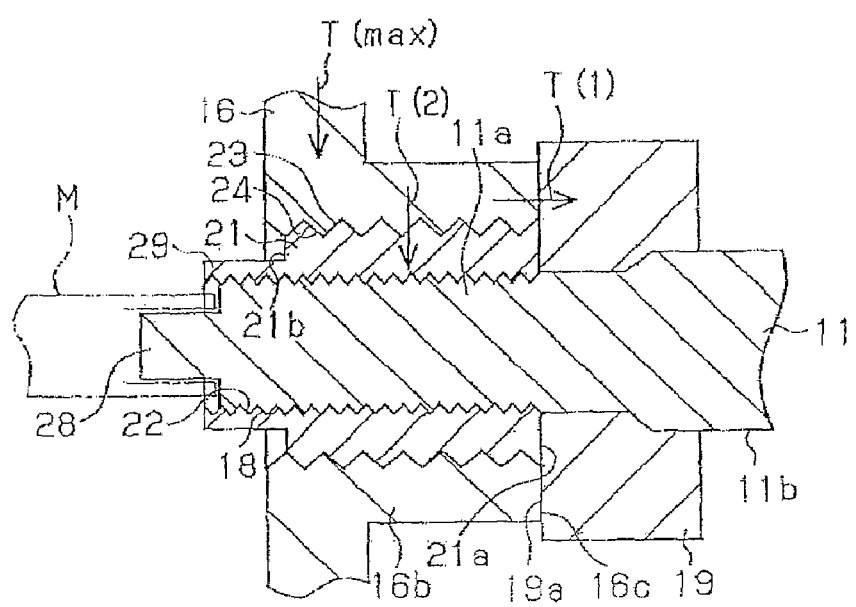
FIG. 2 is a partially enlarged view of the power transmission mechanism according to the preferred embodiment of the present invention.

As shown in FIGS. 1 and 2, a screw mechanism is used for fastening the hub 16 to the drive shaft 11. Specifically, the outer end portion 11a of the drive shaft 11 is formed on the outer periphery thereof with an externally threaded portion 18 or a second externally threaded portion. For installing the drive shaft 11 through the drive shaft seal device 12 by inserting the outer end portion 11a of the drive shaft 11 through the drive shaft seal device 12, the drive shaft 11 is formed such that the diameter of the externally threaded portion 18 is smaller than that of the portion 11b of the drive shaft 11 that slidably contacts with the shaft seal device 12.

A cylindrical screw seat member 19 is press-fitted on the outer peripheral surface of the drive shaft 11 between the externally threaded portion 18 and the shaft seal device 12. The screw seat member 19 includes a screw seat having an annular screw seat surface 19a that faces the outer end portion 11a of the drive shaft 11. The screw seat member 19 is positioned on the drive shaft 11 by being pressed against the step formed at the boundary between the portion 11b that slidably contacts with the shaft seal device 12 and the outer end portion 11a on which the externally threaded portion 18 is formed.

A cylindrical adapter 21 is disposed around the externally threaded portion 18 of the drive shaft 11. The adapter 21 is made of the same kind of metal as the drive shaft 11 and the hub 16 (or iron-based metal in the preferred embodiment). The adapter 21 is formed in the inner peripheral surface thereof with an internally threaded portion 22 or a first internally threaded portion that is engaged with the externally threaded portion 18 of the drive shaft 11. The adapter 21 is also formed in the outer peripheral surface thereof with an externally threaded portion 23 or a first externally threaded portion. The adapter 21 is fastened securely to the drive shaft 11 by screwing the adapter 21 onto the drive shaft 11 such that an end face 21a of the adapter 21 adjacent to the screw seat member 19 is pressed against radially inner region of the screw seat surface 19a of the screw seat member 19.

The hub 16 is formed at its center with a boss 16b protruding so as to surround the adapter 21. The boss 16b is formed in the inner peripheral surface thereof with an internally threaded portion 24 or a second internally threaded portion that is engaged with the externally threaded portion 23 of the adapter 21. Fastening of the hub 16 to the adapter 21 and hence to the drive shaft 11 is accomplished by screwing the hub 16 onto the adapter 21 such that a top end surface 16c of the boss 16b of the hub 16 is pressed against the screw seat surface 19a of the screw seat member 19.

As seen from FIG. 1, the thread pitch of the externally threaded portion 18 of the drive shaft 11 and the internally threaded portion 22 of the adapter 21 is different from that of the externally threaded portion 23 of the adapter 21 and the internally threaded portion 24 of the hub 16. More specifically, the thread pitch of the former threaded portions 18, 22 is smaller than that of the latter threaded portions 23, 24.

The threaded portions 18, 22, 23, 24 are formed or cut in such spiral directions that causes the thread engagement to be tightened under the influence of torque generated during normal power transmission to the drive shaft 11.

Assembling process for the power transmission mechanism 20 includes a first process in which the adapter 21 is fastened to the drive shaft 11 and a second process after the first process in which the hub 16 is fastened to the adapter 21 and hence to the drive shaft 11. Namely, the adapter 21 is screwed onto the drive shaft 11 such that the adapter 21 is pressed against the screw seat surface 19a of the screw seat member 19 in the first process, and the hub 16 is screwed onto the adapter 21 and the drive shaft 11 such that the hub 16 is pressed against the screw seat surface 19a of the screw seat member 19 in the second process. A whirl-stopper 28 protrudes from the end face of the outer end portion 11a of the drive shaft 11 to be held by a chuck M of an assembling machine in the first process of fastening the adapter 21 to the drive shaft 11 by screwing. The whirl-stopper 28 has a diameter that is smaller than that of the externally threaded portion 18 of the drive shaft 11 so that the chuck M can hold the whirl-stopper 28 in a stable manner even when the adapter 21 is located over the whirl-stopper 28 during relative screwing movement of the drive shaft 11 and the adapter 21. Thus, this difference in diameter provides a space for permitting the chuck to hold the swirl-stop portion 28.

The adapter 21 has a whirl-stopper 29 protruding from an end face 21b of the adapter 21 opposite to the end face thereof adjacent to the screw seat member 19, and the whirl-stopper 29 is to be held by a chuck of an assembling machine during the first process of fastening the adapter 21 to the drive shaft 11 and the second process of fastening the hub 16 to the adapter 21. The whirl-stopper 29 has a diameter that is smaller than that of the externally threaded portion 23 of the adapter 21 so that the chuck M can hold the whirl-stopper 29 in a stable manner even when the hub 21 is located over the whirl-stopper 29 particularly during the second process of relative screwing movement of the hub 16 and the adapter 21. Thus, this difference in diameter provides a space for permitting the chuck to hold the swirl-stop portion 29.

Figure 4:
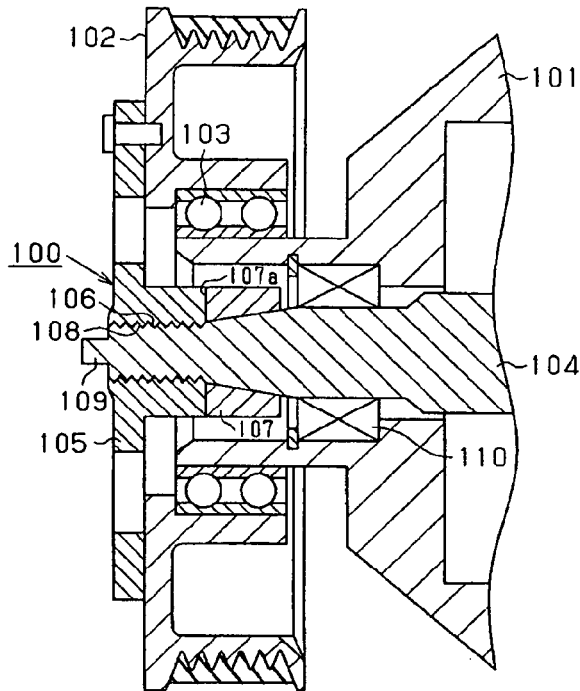
FIG. 4 is a cross-sectional partial view of a refrigerant compressor around a power transmission mechanism according to prior art.
Figure 5:
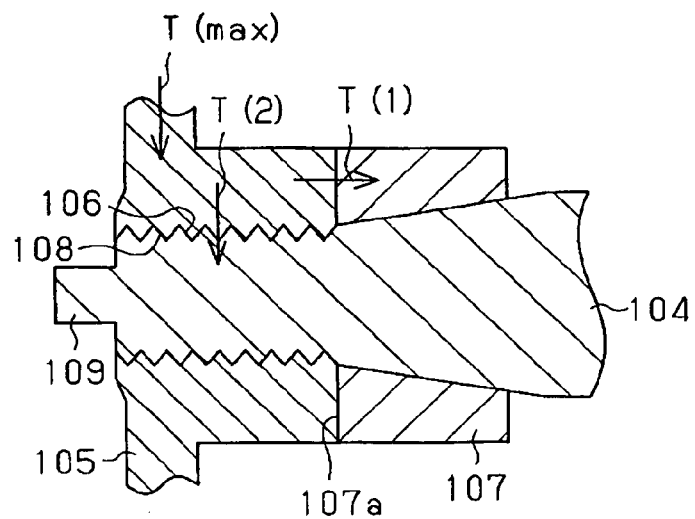
FIG. 5 is a partially enlarged view of the power transmission mechanism according to the prior art.

The following will describe the main operational effect of the power transmission mechanism 20 in detail referring also to FIGS. 4 and 5 showing the prior art.

In the prior art as shown in FIG. 5, the torque is transmitted from the hub 105 to the drive shaft 104 through two different paths, i.e. one is through the screw seat member 107 as indicated by an arrow T(1) and the other through the screw engagement between the internal threads 108 of the hub 105 and the external threads 106 of the drive shaft 104 as indicated by an arrow T(2). Thus, when maximum value of the torque (maximum torque) transmitted from the hub 105 to the drive shaft 104 is represented as "T(max)", the torque transmitted from the hub 105 to the screw seat member 107 as "T(1)", and the torque transmitted from the internally threaded portion 108 of the hub 105 to the externally threaded portion 106 of the drive shaft 104 as "T(2)", it is expressed that "T(max)=T(1)+T(2)." In order to transmit the maximum torque T(max) from the hub 105 to the drive shaft 104, tightening torque of the hub 105 on the drive shaft 104 needs to be the maximum torque T(max) or greater.

In the preferred embodiment as shown in FIG. 2, on the other hand, the torque is transmitted from the hub 16 to the drive shaft 11 through two paths, i.e., one is through the end surface 16c of the boss 16b and the screw seat surface 19a of the screw seat member 19 as indicated by an arrow T(1) and the other is through the internally threaded portion 24 of the hub 16 and the externally threaded portion 23 of the adapter 21 as indicated by an arrow T(2). The torque transmission from the adapter 21 to the drive shaft 11 is accomplished through two different paths. One is through the screw engagement between the externally threaded portion 18 of the drive shaft 11 and the internally threaded portion 22 of the adapter 21, and the other is through the end face 21a of the adapter 21 and the screw seat surface 19a of the screw seat member 19.

Assuming that a maximum value of the torque (maximum torque) transmitted from the hub 16 to the drive shaft 11 is the same as in the above-descried prior art, or T(max), the torque transmitted from the end surface 16c of the boss 16b to the screw seat surface 19a of the screw seat member 19 and the torque transmitted from the internally threaded portion 24 of the hub 16 to the externally threaded portion 23 of the adapter 21 are indicated as "T(1)" and "T(2)", respectively. Thus, in order to transmit the maximum torque T(max) from the hub 16 to the drive shaft 11, tightening torque among the hub 16, the adapter 21 and the screw seat member 19 on which the maximum torque T(max) acts needs to be the maximum torque T(max) or greater. However, the torque T(2) transmitted from the hub 16 to the adapter 21 is smaller than the maximum torque T(max) (i.e. T(2)=T(max)−T(1)<T(max)). Thus, in order to transmit the maximum torque T(max) from the hub 16 to the drive shaft 11, the tightening torque between the adapter 21 and the drive shaft 11 may be smaller than the maximum torque T(max) as far as it is greater than the torque T(2).

In the present preferred embodiment, the tightening torque between the adapter 21 and the drive shaft 11 is the torque T(2) or greater and smaller than the maximum torque T(max). Thus, load acting on the drive shaft 11 during assembling of the adapter 21 and the drive shaft 11 by screwing (in the first process) is reduced, so that the damage to the drive shaft 11 such as breakage of the whirl-stopper 28 during the assembling is prevented. Furthermore, the adapter 21 disposed around the drive shaft 11 may be accordingly formed with a larger diameter and the durability of the adapter 21 can be increased. Therefore, the damage to the adapter 21 such as breakage of the whirl-stopper 29 occurring during the first process of fastening the adapter 21 to the drive shaft 11 and the second process of fastening the hub 16 to the adapter 21 is substantially prevented.

The following advantageous effects are also obtained according to the above-described preferred embodiment.

(1) The thread pitch of the externally threaded portion 18 of the drive shaft 11 and the internally threaded portion 22 of the adapter 21 is different from that of the externally threaded portion 23 of the adapter 21 and the internally threaded portion 24 of the hub 16. Thus, even if external force acts on the adapter 21 during the operation of the refrigerant compressor C, the adapter 21 is prevented form moving relative to the hub 16 and the drive shaft 11 and, therefore, is prevented from coming out of the drive shaft 11 and the hub 16.

(2) The thread pitch of the externally threaded portion 18 of the drive shaft 11 and the internally threaded portion 22 of the adapter 21 is smaller than that of the externally threaded portion 23 of the adapter 21 and the internally threaded portion 24 of the hub 16. Thus, since minimum diameter (or the root diameter) of the externally threaded portion 18 has a negative relationship relative to the thread pitch of the drive shaft side external screw portion 18, the minimum diameter can be made large, thereby enhancing the strength of the drive shaft 11.

(3) In the present preferred embodiment, the present invention is applied to the power transmission mechanism 20 of the refrigerant compressor C. As described under "BACKGROUND OF THE INVENTION", the drive shaft 11 is susceptible to damage during assembling of the power transmission mechanism 20 because of the provision of the shaft seal device 12 in the refrigerant compressor C. Thus, the application of the present invention to a refrigerant compressor is especially advantageous in that the above damage can be prevented successfully.

(4) The drive shaft 11 is provided with the small-diameter whirl-stopper 28 that is to be held by the chuck M of the assembly machine during assembling of the drive shaft 11 and the adapter 21 by screwing (or the first process). As described under "BACKGROUND OF THE INVENTION", the whirl-stopper 28 of the drive shaft 11 is easy to break during assembling. Thus, it is especially effective to apply the present invention to such embodiment.

(5) The drive shaft 11, the hub 16 and the adapter 21 are made of the same kind of material. Therefore, difference in thermal expansion among these parts that may occur under a changing temperature, and the problems arising from such different thermal expansion among parts leading to a change in the tightening torque are prevented successfully.

(6) The adapter 21 is provided with the whirl-stopper 29 that is to be held by the chuck M of the assembly machine during assembling of the adapter 21 and the drive shaft 11 (the first process) and assembling of the adapter 21 and the hub 16 (the second process), and the diameter of the whirl-stopper 29 is smaller than that of the externally threaded portion 23 of the adapter 21. Thus, the adapter 21 is stably held by the chuck M so that assembling by screwing is carried out efficiently in the first and second processes.

(7) The assembling process of the power transmission mechanism 20 includes the first process in which the adapter 21 is screwed onto the drive shaft 11 and the second process in which the hub 16 is screwed onto the adapter 21. For example, according to an assembling procedure in which the adapter 21 is screwed onto the drive shaft 11 after the hub 16 has been screwed onto the adapter 21, the hub 16 and the adapter 21 are tightened together after the adapter 21 has been screwed on the drive shaft 11. This procedure requires pressing the hub 16 against the screw seat surface 19a after screwing the adapter 21 onto the drive shaft 11, which is a troublesome and time-consuming work. In the preferred embodiment of the present invention, however, necessary tightening is performed in each of the processes and, therefore, the assembling work can be simplified.

The above preferred embodiment may be modified as follows.

Figure 3:
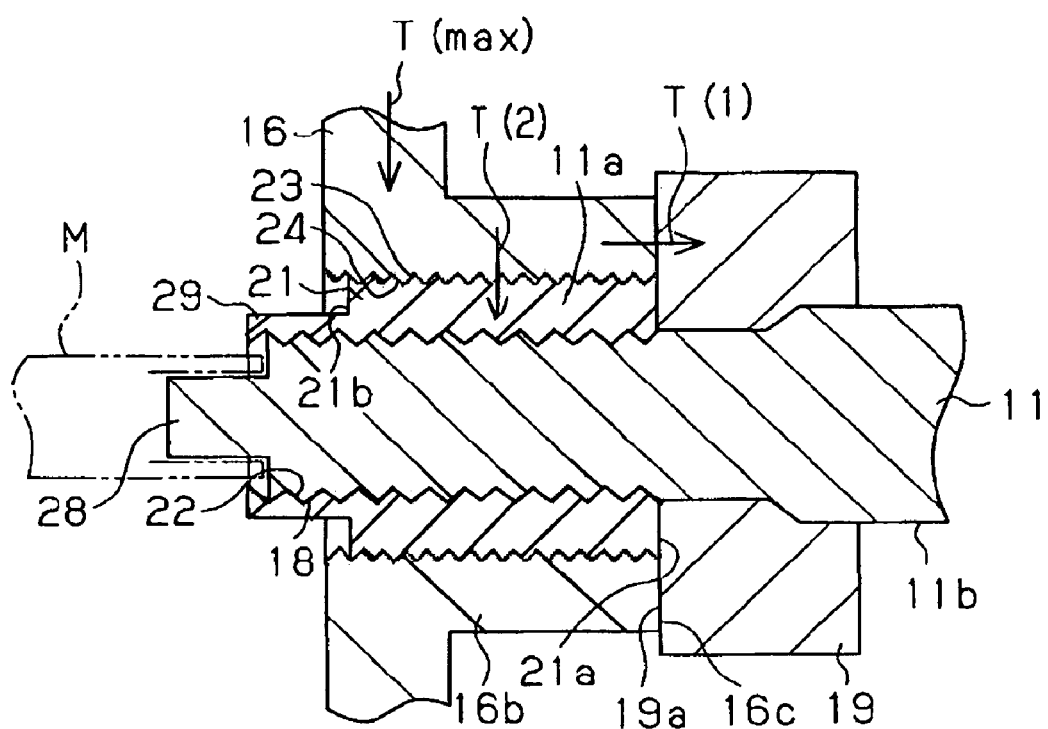
FIG. 3 is a partially enlarged view of the power transmission mechanism according to an alternative embodiment.

With regards to the difference in thread pitch between the externally threaded portion 18 of the drive shaft 11 and the internally threaded portion 22 of the adapter 21 and the externally threaded portion 23 of the adapter 21 and the internally threaded portion 24 of the hub 16, the thread pitch of the former threaded portions 18, 22 may be made larger than that of the latter threaded portions 23, 24 as shown in FIG. 3. By thus increasing the thread pitch of the screw threads 18, 22, the height of these threads 18, 22 which correlates with the thread pitch, and hence the contact area thereof is enlarged so that a larger part of the torque transmitted between the adapter 21 and the drive shaft 11 is assigned to the screw engagement between the threaded portions 18, 22.

Therefore, if any force is applied to the adapter 21 during installation of the hub 16 to the adapter 21 (or the second process) in the direction acting on the adapter 21, which was pressed strongly against the screw seat surface 19a during installation of the adapter 21 on the drive shaft 11 (or the first process) so as to separate it away from the screw seat surface 19a. Thereby to reduce the force of pressing the adapter 21 against the screw seat surface 19a, a remarkable drop in the maximum torque for transmission between the adapter 21 and the drive shaft 11 is prevented. Thus, a power transmission failure due to the slippage between the adapter 21 and the drive shaft 11 is avoided when the torque for transmission from the hub to the drive shaft 11 is maximum.

In the above-preferred embodiment, the screw seat member 19 is formed in such a way that radially outer region of the screw seat surface 19a is in contact with the hub 16 and the radially inner region is in contact with the adapter 21, and the two regions are formed flush with each other. However, the screw seat member 19 is configured such that the above two regions of the screw seat surface 19a are located in two different planes.

In the above-described preferred embodiment, there is provided a single screw seat member 19 that is used as a common seat member for both the hub 16 and the adapter 21. However, a screw seat member for providing the screw seat surface for the hub 16 and a screw seat member for providing the screw seat surface for the adapter 21 are individually provided.

In the above-described preferred embodiment, the screw seat surface 19a is provided by the screw seat member 19 that is provided independently of the drive shaft 11. However, the drive shaft 11 is formed with a step between two shaft portions having different diameters and a wall formed at the step that is utilized as the screw seat surface. By thus providing the screw seat surface integrally with the drive shaft 11, the number of parts of the power transmission mechanism is reduced.

In the above-described preferred embodiment, the present invention is applied to the power transmission mechanism 20 for the refrigerant compressor C. However, the present invention is applicable also to the power transmission mechanism for a fluid machine other than the refrigerant compressor such as a power transmission mechanism provided for use in a hydraulic pump and an air compressor.

In the above-described preferred embodiment, the present invention is applied to the power transmission mechanism 20 for the fluid machine in which the shaft of the power transmission mechanism is provided by the drive shaft of the fluid machine. However, the present invention is applicable also to the power transmission mechanism for machines other than the fluid machine such as a power transmission mechanism for an electric motor having an output shaft.

Therefore, the present examples and embodiments are to be considered as illustrative and not restrictive, and the invention is not to be limited to the details given herein but may be modified within the scope of the appended claims.

What is claimed is:

1. A power transmission mechanism for transmitting driving power between a shaft and a rotor connected to the shaft, comprising:
   a cylindrical adapter located between a shaft and a rotor, the adapter having a first internally threaded portion in its inner peripheral surface and a first externally threaded portion in its outer peripheral surface, the first internally threaded portion being engaged with a second externally threaded portion of the shaft, the first externally threaded portion being engaged with a second internally threaded portion of the rotor;
   a screw seat arranged on the shaft, the screw seat having a screw seat surface; and
   wherein the adapter is screwed onto the shaft such that the adapter is pressed against the screw seat surface, and wherein the rotor is screwed onto the adapter such that the rotor is pressed against the screw seat surface,
   wherein the shaft is a drive shaft of a fluid machine, the fluid machine having a shaft seal device arranged between the drive shaft and a housing of said fluid machine, the shaft seal device sealing off from the outside of the housing, wherein the rotor for transmitting the driving power to the drive shaft is fastened to the drive shaft on the outside of the housing.

2. The power transmission mechanism according to claim 1, wherein a thread pitch of the second externally threaded portion and the first internally threaded portion is different from that of the first externally threaded portion and the second internally threaded portion.

3. The power transmission mechanism according to claim 2, wherein the thread pitch of the second externally threaded portion and the first internally threaded portion is smaller than that of the first externally threaded portion and the second internally threaded portion.

4. The power transmission mechanism according to claim 2, wherein the thread pitch of the second externally threaded portion and the first internally threaded portion is larger than that of the first externally threaded portion and the second internally threaded portion.

5. The power transmission mechanism according to claim 1, wherein a whirl-stopper is provided at an end face of the shaft near the second externally threaded portion for chucking in screwing the adapter onto the shaft, a diameter of the whirl-stopper being smaller than that of the second externally threaded portion.

6. The power transmission mechanism according to claim 1, wherein the shaft, the rotor and the adapter are made of the same kind of material.

7. The power transmission mechanism according to claim 6, wherein the shaft, the rotor and the adapter are made of iron-based material.

8. The power transmission mechanism according to claim 1, wherein a whirl-stopper is provided at an end face of the shaft for chucking in screwing the rotor onto the adapter, a diameter of the whirl-stopper being smaller than that of the first externally threaded portion.

9. The power transmission mechanism according to claim 1, wherein the screw seat is formed on a cylindrical screw seat member, the member being press-fitted on the outer peripheral surface of the shaft.

10. A fluid machine comprising a power transmission mechanism according to claim 1.

11. A process of assembling a power transmission mechanism for transmitting driving power between a shaft and a rotor connected to the shaft, the power transmission mechanism including a cylindrical adapter located between the shaft and the rotor and a screw seat arranged on the shaft, the adapter having a first internally threaded portion in its inner peripheral surface and a first externally threaded portion in its outer peripheral surface, the first internally threaded portion being engaged with a second externally threaded portion of the shaft, the first externally threaded portion being engaged with a second internally threaded portion of the rotor, the screw seat having a screw seat surface, the shaft being a drive shaft of a fluid machine that includes a shaft seal device arranged between the drive shaft and a housing of said fluid machine, the shaft seal device sealing off from the outside of the housing, comprising the step of:
   inserting the drive shaft into the shaft seal device;
   screwing the adapter onto the shaft such that the adapter is pressed against the screw seat surface; and
   screwing the rotor onto the adapter and the shaft such that the rotor is pressed against the screw seat surface.

* * * * *